United States Patent [19]

Takeuchi et al.

[11] Patent Number: 5,635,307
[45] Date of Patent: Jun. 3, 1997

[54] THIN-FILM ELECTROLUMINESCENT ELEMENT

[75] Inventors: Youji Takeuchi, Toride; Tsunemi Ohiwa, Osaka; Hiroshi Fujiyasu, Hamamatsu, all of Japan

[73] Assignee: Hitachi Maxell, Ltd., Osaka, Japan

[21] Appl. No.: 171,433

[22] Filed: Dec. 22, 1993

[30] Foreign Application Priority Data

Dec. 25, 1992 [JP] Japan .................................. 4-346584

[51] Int. Cl.$^6$ .................................................. H05B 33/14
[52] U.S. Cl. ........................ 428/690; 428/691; 428/917; 313/500; 313/501; 313/502; 313/503; 313/504; 313/505; 313/506
[58] Field of Search ........................ 428/690, 691, 428/917; 313/500–506

[56] References Cited

U.S. PATENT DOCUMENTS

| | | | |
|---|---|---|---|
| 5,037,709 | 8/1991 | Tomomura et al. | 428/690 |
| 5,153,889 | 10/1992 | Sugawara et al. | 372/45 |
| 5,319,219 | 6/1994 | Cheng et al. | 257/14 |

*Primary Examiner*—Charles Nold
*Attorney, Agent, or Firm*—Birch, Stewart, Kolasch & Birch, LLP

[57] ABSTRACT

A thin-film EL element having as a laminated luminescent composite a configuration comprising at least a first layer and a second layer wherein (1) the first layer comprises a compound having a lattice constant, before lamination, larger than that of a compound constituting the second layer, and contains manganese as a luminescent center impurity, (2) the difference between the lattice constant, before lamination, of the compound of the first layer and the compound constituting the second layer is 5% or more, and (3) the peak value of the emission spectrum of the laminated luminescent composite rests on 590 nm or more, whereby the thin-film EL element can provide red light having high color purity.

5 Claims, 2 Drawing Sheets

Prior Art

THIN-FILM ELECTROLUMINESCENT ELEMENT

BACKGROUND OF THE INVENTION

1. Field of the Invention

The present invention relates to a thin-film electroluminescent element (hereinafter referred to as "thin-film EL element") wherein the luminescent composite is a laminated layer comprising at least a first layer and a second composite. Especially the invention relates to materials for the luminescent layer.

2. Discussion of the Relate Art

Thin-film EL elements are useful as displays because they are thin and the displaying state is very precise.

FIG. 3 is an enlarged cross-sectional view of a conventional thin-film EL element. As shown in the figure, on a transparent substrate 1, such as a glass plate, there is formed a transparent electrode 2, such as indium-tin oxide film (hereinafter referred to as "ITO film") and $SiO_2$ film, and further on the electrode there is formed, such as by sputtering, a first insulation film 3 comprising an oxide, such as $Ta_2O_3$ and $SiO_2$, a nitride, such as $Si_3N_4$, or a laminated film of the above-mentioned oxide film and nitride film.

On this first insulation film 3 a luminescent layer 4 comprising a superlattice layer is provided, and further a second insulation film 5, having the same material as the first insulation film 3, is formed. On the second insulation film 5 a back plate 6 comprising aluminum, etc. is provided. The transparent electrode 2 and the back plate 6 are connected to a power source 7 to exert the luminescence of the element.

Heretofore, regarding this thin-film EL element, only a mixture of ZnS and Mn, a material for yellow-orange color, has been put to practical use.

For a full range of color, a mixture of ZnS and Sm and a mixture of CaS and Eu have been studied as materials for red. However, a material satisfying both brightness and color purity has not been obtained.

SUMMARY OF THE INVENTION

The object of the present invention in, solving the defects of the prior art technology is to provide a thin-film EL element that can provide the red luminescence having both a high brightness and a high color purity.

To attain the abovementioned object, the present invention provides a thin-film EL element in which the luminescent layer is a laminated layer comprising at least a first layer and a second layer. In the element, (1) the first layer mainly consists of a compound whose lattice constant before lamination is higher than that of a compound constituting the second layer and contains manganese as luminescent center impurity, (2) the difference between the lattice constant before lamination of the main compound of the first layer and that of the compound constituting the second layer is 5% or more, and (3) the peak value of the emission spectrum of the luminescent layer is 590 nm or more.

The present invention has such a structure as mentioned above, and alternate lamination of the first layer and the second layer which differ 5% or more in the lattice constants before lamination makes it possible to give red luminescence having high color purity through, for example, the generation of crystalline distortion.

DETAILED DESCRIPTION OF THE INVENTION

Figure 1:
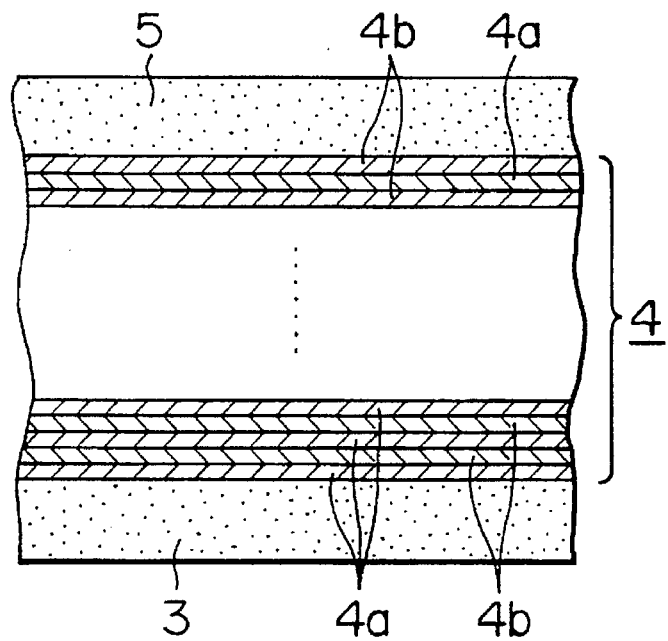
FIG. 1 is a partly enlarged sectional view of the thin-film EL element of the present invention.
Figure 3:
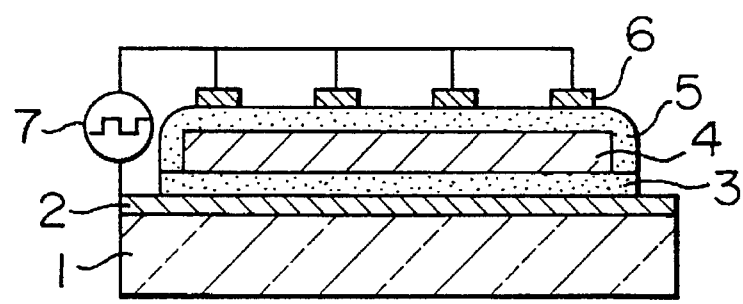
FIG. 3 is an enlarged sectional view of a thin-film EL element.

The general structure of the thin-film EL element of the examples according to the present invention is similar to FIG. 3, and an explanation thereon is unnecessary. As shown in FIG. 1, the luminescent layer 4 present between the first insulation layer 3 and the second insulation layer 5 is composed of a layer laminated alternately and in numbers with the first layer 4a and the second layer 4b.

The main compounds of the first layer 4a and the second layer 4b consist of compounds of metals belonging to the Element Periodic Table group II. Concretely, they are selected from the group of CdS, ZnS, CdSe, ZnSe, ZnTe, CdTe, SrS, SrSe, SrTe, CaS, CaSe, CaTa, MgS, MgSe, MgTe, etc.

The first layer 4a mainly consists of a compound whose lattice constant before lamination is higher than that of a compound constituting the second layer 4b and contains a predetermined amount of manganese (Mn) as luminescent center impurity.

The difference of 5% or more is necessary between the lattice constant before lamination of the main compound of the first layer 4a and that of the compound constituting the second layer 4b.

The concentration of manganese in the first layer 4a is 0.1 to 10 mol %, preferably 0.5 to 2 mol %.

The film thicknesses of the first layer 4a and the second layer 4b are 1000 Å or less, preferably 5 to 100 Å. By making the film thickness thin as mentioned above, red luminescence having higher brightness is obtained.

DESCRIPTION OF THE PREFERRED EMBODIMENT

Examples are explained in the following. Example 1

On a transparent substrate 1 made of a glass a transparent electrode 2 comprising ITO film was formed, and on it a first insulation layer 3 was provided by sputtering $Ta_2O_5$ to 4000 Å thickness.

On the first insulation layer 3, a first layer 4a comprising a mixture of CdSe and Mn that contained 1 mol % of Mn and having 10 Å thickness, and a second layer 4b comprising ZnS and having 30 Å thickness were alternately laminated to form a luminescent layer 4 having 6000 Å thickness as the whole.

Further, on this luminescent layer 4 a second insulation layer 5 was provided by sputtering $Ta_2O_5$ to 4000 Å thickness. Then a back plate 6 comprising aluminum was formed by the resistance method to make a thin-film EL element.

In this Example, the lattice constant before lamination of CdSe, the main compound of the first layer 4a, is larger than that of ZnS composing the second layer 4b, and the difference is 9%.

EXAMPLE 2

The experiment was conducted in the same manner as in Example 1 except that the first layer 4a comprising a mixture of CdSe and Mn had a film thickness of 30 Å and that the second layer 4b had a film thickness of 10 Å.

Accordingly, also in this Example the difference between the lattice constant before lamination of the main compound 4a of the first layer and that of the compound composing the second layer 4b is 9%.

EXAMPLE 3

The experiment was conducted in the same manner as in Example 1 except that a mixture of CdS and Mn that contained 1 mol % Mn was used in place of a mixture of CdSe and Mn.

In this Example, the lattice constant before lamination of the mixture of CdS and Mn, the main compound of the first layer 4a, is larger than that of ZnS composing the second layer 4b, and the difference is 7%.

EXAMPLE 4

The experiment was conducted in the same manner as in Example 1 except that the first layer 4a consisting of a mixture of CdS and Mn had a film thickness of 1000 Å and that the second layer 4b consisting of ZnS had a film thickness of 1000 Å.

EXAMPLE 5

The experiment was conducted in the same manner as in Example 1 except that the Mn content in the mixture of CdSe and Mn was 0.1 mol %. EXAMPLE 6

The experiment was conducted in the same manner as in Example 1 except that the second layer 4b had a film thickness of 100 Å.

Comparative Example 1

A thin-film EL element was formed using a single luminescent layer comprising a mixture of ZnS and Mn that contained 1 mol % of Mn and having 6000 Å film thickness. Comparative Example 2

A thin-film EL element was formed which used as the luminescent layer a superlattice obtained by laminating alternately a mixture of ZnS and Mn that contained 1 mol % Mn and CdS containing no Mn.

In Examples 1 to 6 and Comparative Example 1, the luminescent layers were superlattice films.

In the following Table there are shown the brightness ($L_{60}$) and color purity (CIE chromaticity) of the thin-film EL elements fabricated based on the above-mentioned Examples and Comparative Examples. The $L_{60}$ values are ones obtained by operation with threshold voltage plus 60 V (1 KHz sine wave).

TABLE

|  | $L_{60}$ (cd/m$^2$) | CIE chromaticity | |
|---|---|---|---|
|  |  | x | y |
| Example 1 | 1030 | 0.59 | 0.40 |
| Example 2 | 800 | 0.63 | 0.36 |
| Example 3 | 200 | 0.58 | 0.41 |
| Example 4 | 30 | 0.56 | 0.43 |
| Example 5 | 10 | 0.50 | 0.42 |
| Example 6 | 222 | 0.58 | 0.41 |

TABLE-continued

|  | $L_{60}$ (cd/m$^2$) | CIE chromaticity | |
|---|---|---|---|
|  |  | x | y |
| Comparative Example | 1200 | 0.52 | 0.47 |
| Comparative Example | 800 | 0.52 | 0.47 |

Figure 2:
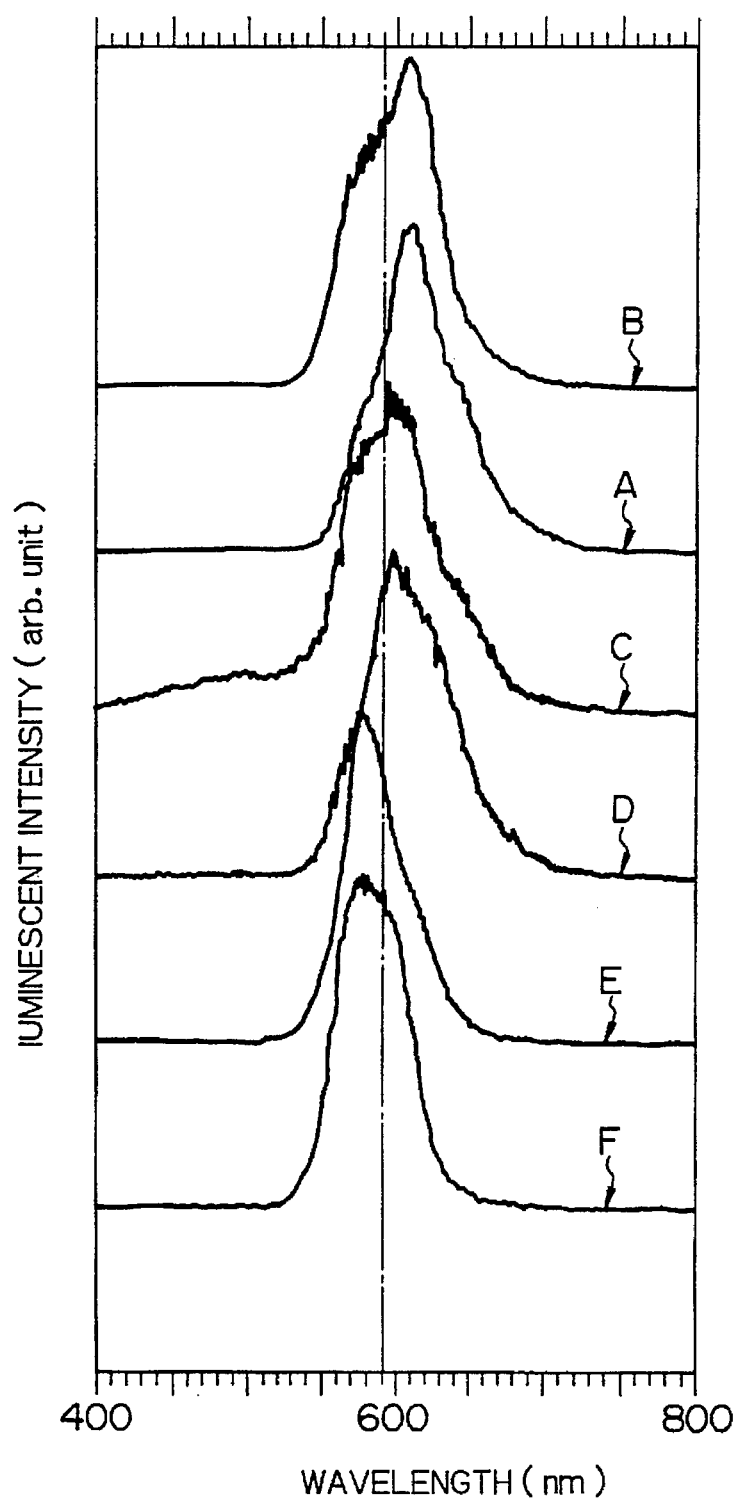
FIG. 2 is a chart showing the luminescent characteristics.

Further, FIG. 2 shows typical examples of the luminescent intensity of the thin-film EL elements prepared based on the Examples and Comparative Examples mentioned above. In the Figure, the curve A is a characteristic curve of Example 1, the curve B Example 2, the curve C Example 5, the curve D Example 6, the curve E Comparative Example 1, and the curve F Comparative Example 2. The dashed line shows the position of 590 nm.

As is clear from the Table and FIG. 2, it is understood that the thin-film EL elements of the present invention have the luminescence shifted to red since they have higher x-values and lower y-values in CIE chromaticity compared with the Comparative Examples. Further, any of the peak values of the emission spectra of the luminescent layers are on 590 nm or more, therefore showing high color purity and red luminescence.

The present invention has the structure mentioned above and can provide thin-film EL elements of red luminescence having high color purity, although the theoretical ground is not clear at present, by laminating alternately a first layer and a second layer which have a difference of 5% or more in their lattice constants before lamination.

What is claimed is:

1. A thin-film EL element comprising a laminated luminescent composite comprising at least a first layer and a second layer, said first layer comprising a compound having, before lamination, a lattice constant larger than the lattice constant of the second compound constituting said second layer, said first layer containing manganese as a luminescent center impurity, the difference between said lattice constant, before lamination, of said compound of said first layer and said lattice constant of said second compound constituting said second layer being 5% or more, and the peak value of the emission spectrum of said laminated luminescent composite being 590 nm or more.

2. A thin-film EL element according to claim 1, wherein said difference between said lattice constant, before lamination, of said first compound of said first layer and said lattice constant of said second compound constituting said second layer is 7% more.

3. A thin-film EL element according to claim 1 or 2, wherein said first compound of said first layer and second compound of said second layer comprise metals belonging to the Periodic Table Group II.

4. A thin-film EL element according to claim 3, wherein said first compound of said first layer comprises at least one member selected from the group consisting of CdS, CdTe, and CdSe and said second compound constituting said second layer comprises ZnS.

5. A thin-film EL element according to claim 1 or 2, wherein the film thicknesses of said first layer and said second layer are 50 Å or less.

* * * * *